United States Patent
Kelly, III et al.

(10) Patent No.: US 9,542,677 B1
(45) Date of Patent: Jan. 10, 2017

(54) RECEIPT GENERATION SERVICE

(71) Applicant: Moneygram International, Inc., Minneapolis, MN (US)

(72) Inventors: John Patrick Kelly, III, Minneapolis, MN (US); Connie Darlene Jacobson, Bloomington, MN (US); Dinesh Pattanashettaru, Chanhassen, MN (US); LaVonne Lynne Engman, Saint Michael, MN (US)

(73) Assignee: Moneygram International, Inc., Minneapolis, MN (US)

( * ) Notice: Subject to any disclaimer, the term of this patent is extended or adjusted under 35 U.S.C. 154(b) by 0 days.

(21) Appl. No.: 15/251,251

(22) Filed: Aug. 30, 2016

Related U.S. Application Data

(63) Continuation of application No. 14/494,522, filed on Sep. 23, 2014, now Pat. No. 9,430,918.

(51) Int. Cl.
| | | |
|---|---|---|
| *G06Q 40/00* | (2012.01) | |
| *G07D 11/00* | (2006.01) | |
| *G07F 19/00* | (2006.01) | |
| *G06Q 20/20* | (2012.01) | |
| *G07G 5/00* | (2006.01) | |
| *G06Q 20/04* | (2012.01) | |
| *G06Q 20/10* | (2012.01) | |

(52) U.S. Cl.
CPC ........ *G06Q 20/209* (2013.01); *G06Q 20/0453* (2013.01); *G06Q 20/10* (2013.01); *G07G 5/00* (2013.01)

(58) Field of Classification Search
CPC .... G06Q 20/20; G06Q 20/204; G06Q 20/209; G07G 5/00
USPC .......................................................... 235/379
See application file for complete search history.

(56) References Cited

U.S. PATENT DOCUMENTS

| | | |
|---|---|---|
| 2005/0151995 A1 | 7/2005 | Hauser et al. |
| 2006/0043171 A1 | 3/2006 | New et al. |
| 2007/0050291 A1 | 3/2007 | Avazian et al. |
| 2009/0063261 A1 | 3/2009 | Scribner et al. |
| 2012/0215650 A1 | 8/2012 | Oba et al. |
| 2013/0110607 A1 | 5/2013 | Basmajian et al. |
| 2014/0358708 A1 | 12/2014 | Perkins et al. |

FOREIGN PATENT DOCUMENTS

WO    WO0146778    *   6/2001

* cited by examiner

*Primary Examiner* — Laura Gudorf
(74) *Attorney, Agent, or Firm* — Norton Rose Fulbright US LLP

(57) ABSTRACT

A method includes receiving, by a server via a network, transaction information descriptive of a money transfer transaction initiated at a point of entry device. The transaction information includes information that identifies a location of the point of entry device. The method includes determining, by the server, receipt information to be included in a receipt for the money transfer transaction. The receipt information may be determined based, at least in part, on the transaction information, and at least a portion of the receipt information included in the receipt satisfies regulatory requirements associated with the location of the point of entry device. The method includes generating, by the server, the receipt that includes the receipt information, and transmitting the receipt from the server to the point of entry device via the network.

27 Claims, 4 Drawing Sheets

RECEIPT GENERATION SERVICE

CROSS-REFERENCE TO RELATED APPLICATION

The present application is a continuation of U.S. patent application Ser. No. 14/494,522, filed Sep. 23, 2014 and entitled "RECEIPT GENERATION SERVICE," the disclosure of which is incorporated herein in its entirety.

TECHNICAL FIELD

The present disclosure relates to money transfer services, and in particular, generating receipts in connection with providing money transfer services.

BACKGROUND

Government regulations mandate that receipts include certain information, and may periodically ask businesses to prove up compliance with these regulations. Failure to comply with such regulations may result in fines or loss of business licenses. It is becoming increasingly common for transactions to be executed across multiple locations, each having different regulatory requirements. For example, in a money transfer transaction, a sending party (e.g., a party sending funds in connection with the money transfer transaction) may be located in a first location (e.g., a first city, a first state, or a first country) and a receiving party (e.g., a party receiving funds in connection with the money transfer transaction) may be located in a second location (e.g., a second city, a first state, or a first country). The first location and the second location may be associated with different regulations that impose different requirements on the content of receipts. Localized generation of receipt content (e.g., at the location where the money transfer transaction originated) may result in creation of a receipt that is provided to a party, such as the receiving party, that may not be compliant with the relevant regulations. This may lead to fines or loss of business license for the operator of a money transfer entity operating the first location, and possibly even an operator of the second location. Additionally, localized generation requires multiple locations to each track and implement different rules as well as have each location accountable for compliance.

BRIEF SUMMARY

The present disclosure is directed to systems, methods, apparatuses, and computer-readable storage media for generating a receipt for a money transfer transaction at a central server. The money transfer transaction may be initiated by a point of entry device, such as a point of sale operated by a money transfer entity, and may facilitate a transfer of funds from a sending party to a receiving party or to an account associated with the receiving party. The central server may receive transaction information from the point of entry device, and, based on the transaction information, may determine receipt information for receipts that are to be provided to the sending party and the receiving party in connection with the money transfer transaction.

The central server may determine the receipt information based on regulatory requirements for multiple locations. For example, the sending party may receive a receipt configured to satisfy regulatory requirements at a first location (e.g., a location where the point of entry device is located), and the receiving party may receive a receipt configured to satisfy regulatory requirements at a second location (e.g., a location where the receiving party resides or where financial institution associated with the account of the receiving party is headquartered or located). The second location may be different from the first location. Therefore, regulatory requirements imposed on the receipt provided to the sending party at the first location may be different from regulatory requirements imposed on the receipt provided to the receiving party at the second location. The central server may generate the receipts and provide the receipts to the appropriate entities. For example, the central server may provide the receipt for the sending party to the point of entry device where the financial transaction was initiated, and may provide the receipt for the receiving party to an electronic device associated with the receiving party, such as a mobile communication device associated the receiving party. Generating receipts for money transfer transactions using the systems, methods, apparatuses, and computer-readable storage media disclosed herein, as opposed at the point of entry device, may increase a likelihood that the receipts provided in connection with money transfer transactions comply with applicable regulatory requirements.

In an aspect, a method includes receiving, by a server via a network, transaction information descriptive of a money transfer transaction initiated at a point of entry device. The transaction information includes information that identifies a location of the point of entry device. The method includes determining, by the server, receipt information to be included in a receipt for the money transfer transaction. The receipt information may be determined based, at least in part, on the transaction information, and at least a portion of the receipt information included in the receipt satisfies regulatory requirements associated with the location of the point of entry device. The method includes generating, by the server, the receipt that includes the receipt information, and transmitting the receipt from the server to the point of entry device via the network.

In another aspect, an apparatus includes a processor, and a memory storing instructions that, when executed by the processor, cause the processor to perform operations. The operations include receiving transaction information descriptive of a money transfer transaction initiated at a point of entry device. The transaction information includes information that identifies a location of the point of entry device. The operations include determining receipt information to be included in a receipt for the money transfer transaction. The receipt information may be determined based, at least in part, on the transaction information, and at least a portion of the receipt information included in the receipt satisfies regulatory requirements associated with the location of the point of entry device. The operations include generating the receipt that includes the receipt information, and transmitting the receipt to the point of entry device via the network.

In yet another aspect, a computer-readable storage medium stores instructions that, when executed by a processor, cause the processor to perform operations. The operations include receiving transaction information descriptive of a money transfer transaction initiated at a point of entry device. The transaction information includes information that identifies a location of the point of entry device. The operations include determining receipt information to be included in a receipt for the money transfer transaction. The receipt information may be determined based, at least in part, on the transaction information, and at least a portion of the receipt information included in the receipt satisfies regulatory requirements associated with the location of the point of entry device. The operations include generating the receipt that includes the receipt information, and transmitting the receipt to the point of entry device via the network.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
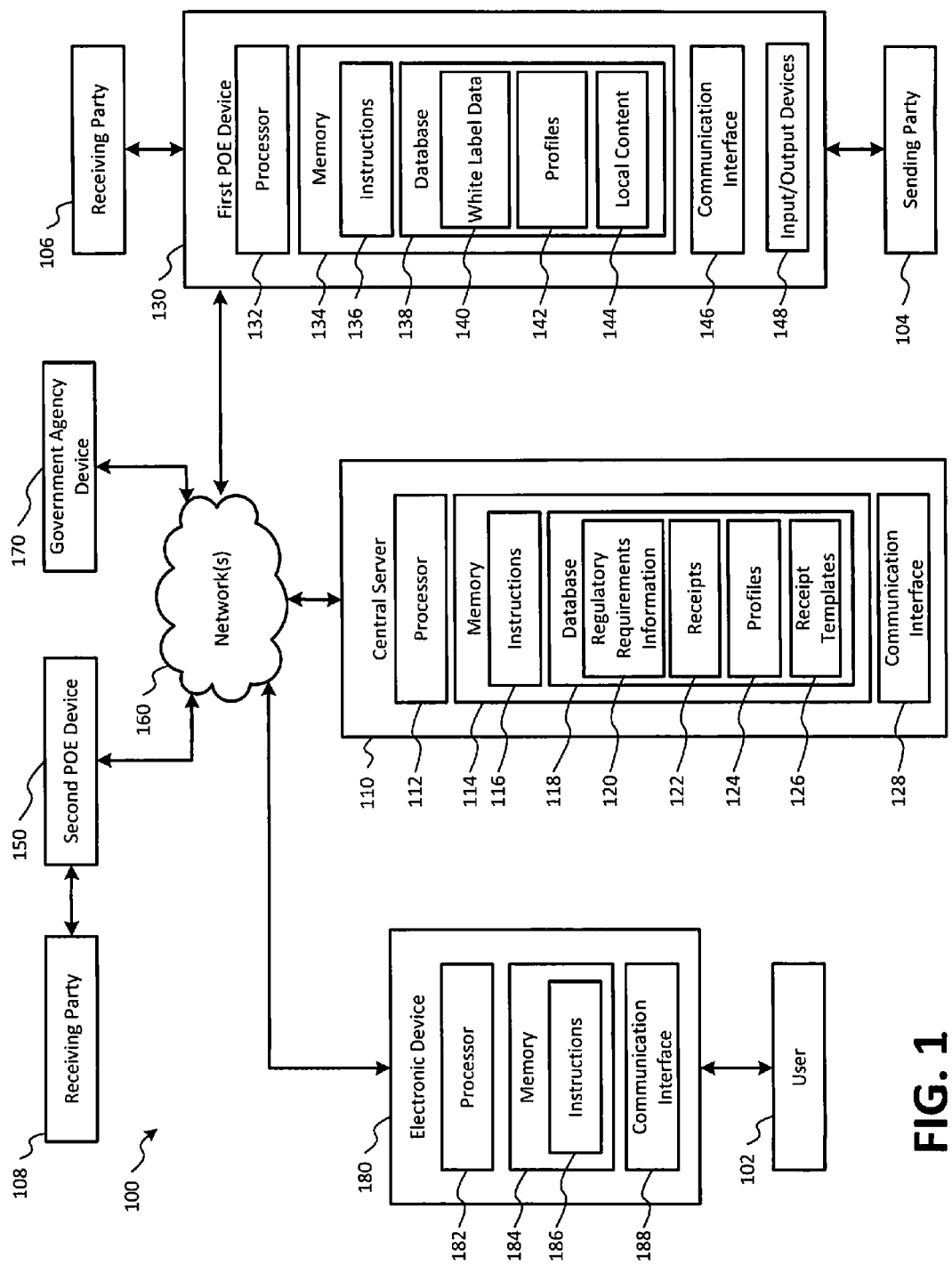
FIG. 1 illustrates a block diagram of a system for generating a money transfer transaction receipt in compliance with regulatory requirements using a central server.

Referring to FIG. 1, a block diagram of a system for generating a money transfer transaction receipt in compliance with regulatory requirements using a central server is shown as a system 100. As shown in FIG. 1, the system 100 includes a central server 110, a first point of entry device 130, a second point of entry device 150, a network 160, a government agency device 170, and an electronic device 180.

The central server 110 includes a processor 112, a memory 114, and a communication interface 128. The memory 114 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 114 may store instructions 116 that, when executed by the processor 112, cause the processor 112 to perform operations described in connection with the central server 110 with reference to FIGS. 1-4.

The memory 114 may store a database 118 that stores information that is to be used to in conjunction with generating receipts for money transfer transactions initiated using the first point of entry device 130, the second point of entry device 150, and/or the electronic device 180, as described in more detail below. The database 118 may include regulatory requirements information 120, receipts 122, profile information 124, and receipt templates 126. The regulatory requirements information 120 may identify regulatory requirements at a plurality of locations, such as a location of the first point of entry device 130 and a location of the second point of entry device 150. The regulatory requirements may specify information that must be included on receipts provided in connection with money transfer transactions. The information may include legal disclaimers and notices information, warranty information, refund and return policy information, explanations of fees charged for the money transfer transaction services, etc., as described in more detail below. It is noted that different locations may have different regulatory requirements. Additionally, some regulatory requirements may require receipts for particular locations to satisfy regulatory requirements of multiple locations, such as regulatory requirements for a first location where the money transfer transaction is initiated by a sending party and regulatory requirements for a second location where a receiving party is to receive funds in connection with the money transfer transaction.

The receipts 122 may include copies of receipts provided to both sending parties and receiving parties in connection with money transfer transactions, as described in detail below. The profile information 124 may include a profile for each party that participates in a money transfer transaction. For each profile of a party to a money transfer transaction, the profile information 124 may include a name of the party, an address of the party, an e-mail address associated with the party, a telephone number of the party, and information associated with past money transfer transactions that the party has participated in. Other information may also be included in the profile information 124, such as locations where the party has participated, as either a sending party or a receiving party, in a money transfer transaction, locations where the party has sent money in a money transfer transaction, etc. Additionally, the profile information 124 may include profiles for a group of individuals that have participated in a particular type of money transfer transactions. For example, a first group profile may identify attributes of persons that have initiated a first type of money transfer transaction and a second group profile may identify attributes of persons that have initiated a second type of money transfer transaction. As an additional example, the group profile may identify parties that frequently transfer money to receiving parties in a particular geographic region or that frequently initiate money transfer transactions at a particular money transfer location. The profile information 124 may be used to target promotion information to participants of a money transfer transaction, such as upgrading from a first type of money transfer transaction to a second type of money transfer transaction, or reducing a fee for a subsequent money transfer transaction. Additional information regarding targeting promotion information to participants of money transfer transactions is provided below.

The receipt templates 126 may include a plurality of layouts for receipts provided in connection with money transfer transactions, and may include receiving party receipt templates, sending party receipt templates, approved receipt templates, receipt templates that are pending approval for use in connection with money transfer services, etc. Additionally, the receipt templates 126 may include various templates configured to satisfy regulatory requirements at one or more geographic locations. For example, the receipt templates 126 may include first receipt templates for money transfer transactions originating from or terminating in a first geographic location (e.g., a first city, state, country, etc.) and second receipt templates for money transfer transactions originating from or terminating in a second geographic location (e.g., a second city, state, country, etc.) that is different from the first location. The first geographic location may be associated with different regulatory requirements than the second geographic location. Further illustrative aspects of utilizing the receipt templates 126 are described below.

It is noted that while the database 118 is shown as being stored at the memory 114 of the central server 110, in an aspect, the database 118 may be stored external to the central server 110. For example, the database 118 may be stored at an external memory device (not shown in FIG. 1) that is coupled to the central server 110, such as a network attached storage device (not shown in FIG. 1) coupled to the network 160 and accessible to the central server 110 via the network 160 using the communication interface 128. It is noted that the database 118 may be a distributed database stored across a plurality of storage devices that may be geographically distributed or may be centrally located.

The communication interface 128 may be configured to communicatively couple the central server 110 to one or more networks, such as the network 160 via a wired or wireless connection established according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a $3^{rd}$ generation (3G) protocol, a $4^{th}$ generation (4G)/long term evolution (LTE) protocol, etc.). The central server 110 may communicate with the first point of entry device 130, the second point of entry device 150, and the government agency device 170 via the connection to the network 160, as described in more detail below.

The first point of entry device 130 includes a processor 132, a memory 134, a communication interface 146, and one or more input/output (I/O) devices 148. The memory 134 may include ROM devices, RAM devices, one or more HDDs, flash memory devices, SSDs, other devices configured to store data in a persistent or non-persistent state, or a combination of different memory devices. The memory 134 may store instructions 136 that, when executed by the processor 132, cause the processor 132 to perform operations described in connection with the first point of entry device 130 with reference to FIGS. 1-4.

The memory 134 may store a database 138 that stores information that may be used to finalize receipts for money transfer transactions initiated using the first point of entry device 130, as described in more detail below. The database 138 may include white label data 140, profile information 142, and local content 144. The white label data 140 may include information associated with the operator of the first point of entry device 130. For example, when the operator of the first point of entry device 130 is different from an operator of the central server 110, the white label data 140 may include a logo of the operator of the first point of entry device 130, address information associated with a location of the first point of entry device 130 and/or a headquarters of the operator of the first point of entry device 130, etc. The white label data 140 may be used to brand a white label receipt generated by the central server 110 with a brand associated with the operator of the first point of entry device 130, as described in more detail below.

The profile information 142 may include a profile for each party that participates in a money transfer transaction facilitated, at least in part, by the first point of entry device 130. For each profile, the profile information 142 may include a name of the party, an address of the party, an e-mail address associated with the party, a telephone number of the party, and information associated with past money transfer transactions that the party has participated in at the location where the first point of entry device 130 is operated. Other information may also be included in the profile, such as information identifying other money transfer locations operated by operator of the first point of entry device 130 where the party has participated in a money transfer transaction, either a sending party or a receiving party, locations where the party has sent money in a money transfer transaction, etc. Additionally, the profile information 142 may include profiles for a group of individuals that have participated in a particular type of money transfer transactions, as described above with respect to the profile information 124. The profile information 142 may be used to target promotion information to participants of a money transfer transaction, such as upgrading from a first type of money transfer transaction to a second type of money transfer transaction, or reducing a fee for a subsequent money transfer transaction. The local content 144 may include local advertising content that may be inserted into receipts (e.g., by printing over a blank area of the receipt) by the first point of entry device 130. Additional information regarding targeting promotion information and local content to participants of money transfer transactions is provided below It is noted that while the database 138 is shown as being stored at the memory 134 of the first point of entry device 130, in an aspect, the database 138 may be stored external to the first point of entry device 130. For example, the database 138 may be stored at the central server 110, or at an external memory device (not shown in FIG. 1) that is coupled to the first point of entry device 130, such as a network attached storage device (not shown in FIG. 1) coupled to the network 160 and accessible to the first point of entry device 130 via the network 160 using the communication interface 146. It is noted that the database 138 may be a distributed database stored across a plurality of storage devices that may be geographically distributed or may be centrally located.

The communication interface 146 may be configured to communicatively couple the first point of entry device 130 to one or more networks, such as the network 160 via a wired or wireless connection established according to one or more communication protocols or standards (e.g., an Ethernet protocol, a TCP/IP protocol, an IEEE 802.11 protocol, and an IEEE 802.16 protocol, a 3G protocol, a 4G/LTE protocol, etc.). The first point of entry device 130 may communicate with the central server 110 via the connection to the network 160, as described in more detail below. The I/O devices 148 may include a money order printer, a signature pad, a camera, a pin pad module, a financial card reader, a biometric scanner, a receipt printer, another printing device, a barcode scanner, a metering device, a weight sensor, a check reader, a mouse, a keyboard, a touchscreen display device, a printer, a card scanner, a numeric keypad, a check reader, other types of input and output devices, or a combination thereof.

Although not shown in FIG. 1 for simplicity, the second point of entry device 150 may include a processor, a memory, a communication interface, and I/O devices that operate as described above with respect to the first point of entry device 130. Additionally, the memory of the second point of entry device 150 may store instructions that, when executed by the processor of the second point of entry device 150, cause the second point of entry device 150 to perform the operations described with reference to the first point of entry device 130 and/or the second point of entry device 150 with reference to FIGS. 1-4. The memory of the second point of entry device 150 may store a database that includes white label data, profile information, and local content that is configured for a location where the second device is located. For example, the local content stored at the database of the second point of entry device 150 may be associated with advertisements for a second location that is different from a location where the first point of entry device 130 is located. Further, it is noted that the database of the second point of entry device 150 may include information that is the same as information stored at the database 138 of the first point of entry device 130. For example, when the first point of entry device 130 and the second point of entry device 150 are operated by a same money transfer entity, the white label data stored at the respective databases may be substantially similar, differing only in information regarding the location where the respective point of entry devices are operated/located.

The electronic device 180 may be a personal computing device, a tablet computing device, a mobile communication device, a smartphone device, a laptop computing device, a kiosk device, another computing device, or a combination thereof, configured to perform the operations of the electronic device 180, as described with reference to FIG. 1. The electronic device 180 includes a processor 182, a memory 184, and a communication interface 188. The memory 184 may store instructions 186 that, when executed by the processor 182, cause the processor 182 to perform the operations associated with the electronic device 180, as described with reference to FIG. 1. The instructions 186 may be an application created by a money transfer entity, and may facilitate money transfer transactions to/from the electronic device 180 and/or money transfer transactions to/from an account associated with a user 102 operating the electronic device 180. For example, the application may cause a graphical user interface (GUI) to be presented at a display device (not shown in FIG. 1) of the electronic device 180. The GUI may include one or more menus that enable the user 102 to initiate a money transfer transaction to a receiving party or to receive funds in connection with the money transfer transaction.

The communication interface 188 may be configured to communicatively couple the electronic device 180 to one or more networks, such as the network 160 via a wired or wireless connection established according to one or more communication protocols or standards (e.g., an Ethernet protocol, a TCP/IP protocol, an IEEE 802.11 protocol, and an IEEE 802.16 protocol, a 3G protocol, a 4G/LTE protocol, etc.). The electronic device 180 may communicate with the central server 110 via the connection to the network 160. For example, the user 102 may use GUI to initiate a money transfer transaction. The application may cause the electronic device 180 to transmit transaction information associated with the money transfer transaction to the central server 110. The central server 110 may generate a receipt for the money transfer transaction and may transmit the receipt to the electronic device 180. Additional aspects of generating receipts for money transfer transactions are described detail below.

During operation, a sending party 104 may visit a money transfer location associated with a money transfer entity to initiate a money transfer transaction. In an aspect, the money transfer transaction may be initiated by an employee of the money transfer entity using the first point of entry device 130. For example, the employee may obtain sending party information, receiving party information, money transfer transaction type information, and payment from the sending party 104. The sending party information may include a name of the sending party, an address of the sending party, a telephone number associated with of the sending party, an e-mail address of the sending party, financial account information associated with the sending party, other information associated with the sending party, or a combination thereof. The receiving party information may include a name of the receiving party, an address of the receiving party, a telephone number associated with of the receiving party, an e-mail address of the receiving party, financial account information associated with the receiving party, other information associated with the receiving party, or a combination thereof.

The money transfer transaction type information may indicate whether the money transfer transaction is a cash-to-cash money transfer transaction, a cash-to-account money transfer transaction, a credit money transfer transaction, a prepaid money transfer transaction, an account-to-account money transfer transaction, an account-to-cash money transfer transaction or some other type of money transfer transaction type. In a cash-to-cash money transfer transaction, the sending party provides cash to the employee of the money transfer entity to fund the money transfer transaction, and the receiving party receives cash in connection with the money transfer transaction. In a cash-to-account money transaction, the sending party provides cash (or payment by debit card) to the employee of the money transfer entity to fund the money transfer transaction, and the funds are deposited into an account associated with the receiving party. In a credit money transfer transaction, the sending party uses a credit card to fund the money transfer transaction, and the receiving party receives cash or a deposit into the account associated with the receiving party. In a prepaid money transfer transaction, the sending party provides a prepaid card including a redemption code, or provides just the redemption code, to the receiving party, and the receiving party may then visit a location associated with the money transfer entity (or a website operated by the money transfer entity) to redeem (e.g., receive funds) the prepaid card using the redemption code. In an account-to-account money transfer transaction, the sending party may provide financial account information (e.g., bank account number, routing number, etc.) to the money transfer entity, and may authorize an electronic funds transfer to an account of the receiving party. In an account-to-cash money transfer transaction, the sending party may provide the financial account information to the money transfer entity to authorize withdrawal of funds from a financial account identified by the financial account information, and the receiving party may be provided with a redemption code that may be used to receive cash in connection with the money transfer transaction.

The employee of the money transfer entity may provide inputs corresponding to the obtained information (e.g., the sending party information, the receiving party information, the money transfer transaction type information, and the payment information) to the first point of entry device 130 (e.g., using the I/O devices 148). In response to receiving the inputs, the first point of entry device 130 may transmit transaction information descriptive of the money transfer transaction to the central server 110 via the network 160 using the communication interface 146. The central server 110 may receive the transaction information from the first point of entry device 130 via the network 160 using the communication interface 128. The transaction information may include information that identifies a location (e.g., an address, a city, state, country, etc.) of the first point of entry device 130.

In response to receiving the transaction information, the central server 110 may determine receipt information. The receipt information may correspond to information that is to be included in a receipt for the money transfer transaction. At least a portion of the receipt information included in the receipt may satisfy regulatory requirements associated with the location of the first point of entry device 130. In an aspect, the central server 110 may determine the receipt information based, at least in part, on the transaction information. For example, the central server 110 may query the regulatory requirements information 120 to identify receipt requirements applicable to the location of the first point of entry device 130. A receipt requirement may be applicable when regulatory requirements indicated in the regulatory requirements information 120 require that receipts for a particular location, such as the location of the first point of entry device 130, include certain information, such as legal notices and disclaimers, warranty information, refund policy information, etc. In additional or alternative aspects, the receipt requirement may be applicable when regulatory requirements indicated in the regulatory requirements information 120 require that receipts in connection with money transfer transactions spanning multiple locations comply with all of the regulations associated a first location (e.g., regulations associated with a location where the first point of entry device 130 is located) and one or more regulations associated with a second location (e.g., a location where the receiving party resides or is to receive funds in connection with the money transfer transaction). Some information may be included in receipts, but not subject to regulatory requirements, such as discount information providing a discount for a subsequent money transfer transaction.

In an aspect, determining the receipt information may include selecting a receipt template from among a plurality of receipt templates stored at the database 118. For example, as shown in FIG. 1, the database 118 includes receipt templates 126. The receipt templates 126 may include receipt templates for use in generating receipts in connection with providing financial transaction services to individuals across a plurality of locations (e.g., different cities, states, countries, etc.). The receipt template selected by the central server 110 may be used to generate a receipt that is to be provided to the sending party 104 in connection with the money transfer transaction, and a second receipt template may be selected by the central server 110 for use in generating a receipt that is to be provided to a receiving party in connection with the money transfer transaction. In an aspect, the central server may generate multiple receipts for the receiving party in connection with a single money transfer transaction. For example, a first receiving party receipt may indicate that a sending party has transferred funds to the receiving party and may include information that may be used by the receiving party to receive the funds, and a second receiving party receipt may be generated at the time the receiving party receives the funds. The first and second receiving party receipts may each comply with regulatory requirements and may be generated using different templates selected from among the receipt templates 126.

As explained above, the regulatory requirement information may include legal notices and disclaimers, warranty information, refund policy information, sales tax information, explanations of fees charged in connection with a money transfer transaction or other financial service (e.g., bill pay), etc. Each of the plurality of receipt templates (e.g., each of the receipt templates 126) may include one or more data fields for inserting regulatory requirement information. Different locations may be associated with different regulatory requirements. Stated another way, a first location (e.g., the location of the first point of entry device 130) may have different regulatory requirements imposed on money transfer transactions and financial services than a second location (e.g., a location of the second point of entry device 150) that is disparate from the first location. Thus, in an aspect, the central server 110 may select the receipt template based, at least in part, on the location of the point of entry device 130.

In an aspect, each of the receipt templates included in the receipt templates 126 may be associated with a status identifier. A status identifier for a particular receipt template may indicate whether the particular receipt template has been approved by a legal department of an operator of the central server 110 (or by outside counsel employed by the operator) as complying with regulatory requirements for receipts for transactions occurring at a particular location. When the central server 110 is selecting the receipt template, the central server 110 may exclude receipt templates associated with status identifiers that indicate receipt templates that have not been approved.

Using status identifiers to indicate whether receipts have been approved by the legal department may increase a likelihood that generated receipts comply with changes to the regulatory requirements quickly. For example, as changes to regulatory requirements are proposed, legal departments may begin working on a new receipt template to comply with the proposed changes. Upon creating the new receipt template, the status identifier may indicate that the new receipt template has not been approved by the legal department for use in generating receipts, and, therefore, may not be selected by the central server 110 in connection with generating receipts for initiated money transfer transactions. Once the legal department is satisfied that the new receipt template complies with the changes to the regulatory requirements, the status identifier may be updated to indicate that the new receipt template has been approved by the legal department, and is available for selection by the central server 110 in connection with generating receipts for initiated money transfer transactions.

In an additional aspect, the status identifiers associated with the receipt templates may include information indicating a date upon which the new receipt template is approved for use. For example, the proposed changes to the regulatory requirements may be published for public review and comment for a period of time, and subsequently revised prior to finalizing the changes. Once the changes are finalized, a date on which the changes will go into effect may be announced. The status identifier may indicate that the new receipt template is to be made available on the date on which the changes will go into effect. Thus, on the date the changes go into effect, the central server 110 may begin generating receipts using the new template that complies with the changes to the regulatory requirements.

Additionally or alternatively, the status identifiers may indicate that the new receipt templates replace previous versions of the receipt templates. The versions may be specified by an alpha-numeric code, a numeric only code, or some other identifier. If the changes to the regulatory requirements were associated with a money transfer transaction at a first location, the status identifier for the new receipt template may indicate that the new receipt template replaces a previous receipt template for the first location. To illustrate, the status identifier may indicate that the new receipt template is "version 1.2," and replaces the previous receipt template "version 1.1." This may enable the central server 110 to utilize version control to manage the receipt templates 126, which may be beneficial if a change in the regulatory requirements is rolled back to a previous version of the regulatory requirements having a corresponding previous version of the receipt template. Thus, the status identifiers may assist the central server 110 in selecting a receipt template that is in compliance with the most up-to-date changes in regulatory requirements associated with receipts for money transfer transactions and/or financial services, and that the regulatory information (e.g., the legal notices and disclaimers, the warranty information, the refund policy information, the sales tax information, explanations of the fees charged in connection with the money transfer transaction or the other financial service, etc.).

In an aspect, each of the plurality of receipt templates (e.g., each of the receipt templates 126) may include a pre-populated legal disclaimers and notices section configured to satisfy the regulatory requirements for a particular location, such as the location of the first point of entry device 130. The information pre-populated into the legal disclaimers and notices section of the selected receipt template may include the legal notices and disclaimers, the warranty information, the refund policy information, and the explanations of fees charged, etc., as required by the relevant regulatory requirements associated with the location of the first point of entry device 130.

The central server 110 may also determine service level information associated with the money transfer transaction. In an aspect, the central server 110 may determine the service level information based on the based on the transaction information. The service level information may include an estimated date when funds transferred in connection with the money transfer transaction will be accessible to a receiving party. The service level information may also include contact information for a money transfer entity that operates the point of entry device 130. The contact information may indicate that the receiving party and/or the sending party should contact the money transfer entity using the contact information if the respective party has a question regarding the money transfer transaction. Each of the plurality of receipt templates (e.g., each of the receipt templates 126) may include at least one service level information data field for inserting service level information determined by the central server 110 in connection with a money transfer transaction (or other financial service) initiated using the first point of entry device 130.

In response to determining the receipt information, selecting the receipt template, and determining the service level information, the central server 110 may generate a receipt that includes the receipt information, the regulatory requirements information, and the service level information. The central server 110 may generate the receipt by inserting information associated with the money transfer transaction (e.g., fees, amount of funds provided by sending party, a money transfer transaction type, a recipient associated with the money transfer transaction, the service level information, etc.) into one or more transaction detail data fields of the selected receipt template. The central server 110 may also generate the receipt by inserting the service level information into the at least one service level information data field of the selected receipt template.

The central server 110 may transmit the receipt to the first point of entry device 130 via the network 160 using the communication interface 128. In an aspect, the central server 110 may generate a portable document format (PDF) copy of the receipt, and the PDF copy of the receipt may be transmitted from the central server 110 to the first point of entry device 130 via the network 160 using the communication interface 128. Upon receiving the receipt, the first point of entry device 130 may print the receipt (e.g., using a using a receipt printer included in the I/O devices 148), and an employee operating the first point of entry device 130 may provide the printed receipt to the sending party 104. In an aspect, the central server 110 may store a copy of the receipt at the database 118. For example, as shown in FIG. 1, the database 118 includes receipts 122. The receipts 122 may correspond to receipts generated by the central server 110. The receipts 122 may be used to prove up compliance with the regulatory requirements, as described in more detail below.

In an aspect, the receipt generated by the central server 110 may be a white label receipt that includes a region for inserting white label content generated by the first point of entry device 130. For example, the central server 110 may be operated by a first money transfer entity, and the first point of entry device 130 may be operated by a second money transfer entity that has a licensing agreement with the first money transfer entity. The licensing agreement may specify that the second money transfer entity may use resources of the first money transfer entity to provide money transfer services and/or other financial services. For example, the licensing agreement may specify that the operator of the first point of entry device 130 may utilize the central server 110 for receipt generation in exchange for a fee. Additionally or alternatively, the licensing agreement may specify that the second money transfer entity may utilize connections to financial networks (e.g., electronic funds transfer networks, credit card processing and clearinghouse networks, etc.) operated by the first money transfer entity to provide money transfer transactions and financial services.

Under such an agreement, the region for inserting white label content may be used by the first point of entry device 130 to print content on the receipt. For example, the central server 110 may purposefully leave the region for inserting the white label content blank so that the first point of entry device 130 may print the white label content onto the receipt received from the central server 110. The white label content may include branding information (e.g., a logo of the second money transfer entity) associated with an operator of the first point of entry device 130, contact information associated with the operator of the first point of entry device 130, a website associated with the operator of the first point of entry device 130, etc. In an aspect, the contact information included in the service level information may be different from the contact information included in the white label content, such as when the operator of the first point of entry device 130 and the operator of the central server 110 are different, and where the transfer of funds is provided by resources (e.g., financial network connections, etc.) of the operator of the central server 110. Thus, the receipt, when printed with the white label content (e.g., using a receipt printer included in the I/O devices 148) by the first point of entry device 130, may appear to be completely generated by the first point of entry device 130 and the second money transfer entity, as opposed to by the first money transfer entity operating the central server 110. Additionally, under the licensing agreement, the first money transfer entity may receive a higher fee for generating the white label receipt. In an aspect, different licensees (e.g., the second money transfer entity and a third money transfer entity) having a license agreement with the first money transfer entity may each have a different white label receipt template stored within the receipt templates 126. For each different white label receipt template, the regions of the receipt reserved for inserting the white label content may be different (e.g., to accommodate different sizes or shapes of logos, more or less white label information, etc.). In an aspect, the receipt templates 126 may include a white label receipt template that is common to multiple different money transfer entities having license agreements with first money transfer entity, and the fee for utilizing the common white label receipt template may be less than the fee for utilizing a white label receipt template customized for use by a single money transfer entity. In an aspect, the white label content may be inserted into the receipt by the central server 110, wherein the central server 110 determines the appropriate white label content based on information included in the transaction information. In an additional or alternative aspect, the receipts templates 126 may include receipt templates that are pre-configured to include the white label content.

In an aspect, the central server 110 and/or the first point of entry device 130 may determine promotion information. In an aspect, the promotion information may include discount information that provides a reduced fee during a subsequent money transfer transaction initiated by the sending party 104. For example, initiation of a particular type of money transfer transaction (e.g., a cash-to-account money transfer transaction) may be associated with a first fee amount, and the discount information may enable the sending party 104 to subsequently initiate the particular type of money transfer transaction for a reduced fee that is less than the first fee amount. The promotion information may also encourage sending parties and/or receiving parties to visit a particular money transfer location, such as to encourage sending and receiving parties to visit a recently opened money transfer location, to receive discounts on money transfer transaction fees or other service discounts/upgrades.

In an additional or alternative aspect, the promotion information may provide a reduced delay in providing funds to a receiving party in connection with the subsequent money transfer transaction initiated by the sending party 104. For example, for a particular type of transaction (e.g., a cash-to-account money transfer transaction), it may take a first amount of time (e.g., 2 days) until the funds are available or accessible to the receiving party, unless an expedite fee is paid to reduce the first amount of time to a second amount of time (e.g., 2 hours). However, during the subsequent money transfer transaction, the promotion information may enable the sending party 104 to upgrade the particular type of transaction to the second amount of time without payment of the expedite fee, thereby reducing the amount of time or delay before the funds are available or accessible to the receiving party.

In an additional or alternative aspect, the promotion information may provide an upgraded transaction type for the subsequent money transfer transaction initiated by the sending party 104. For example, the promotion information may enable the sending party 104 to upgrade a subsequent cash-to-cash money transfer transaction to a cash-to-account money transfer transaction at no additional cost, thereby alleviating the need for the receiving party to visit a money transfer location operated by the same money transfer entity that operates the first point of entry device 130 to receive funds in connection with the subsequent money transfer transaction.

By determining promotion information and inserting the promotion information into the receipt generated by the central server 110, sending parties may be enticed to more frequently utilize enhanced services provided by the money transfer entity operating the first point of entry device 130. For example, the sending party 104 may frequently utilize the cash-to-cash money transfer transaction to transfer money to receiving parties, but after receiving a free upgrade to the cash-to-account money transfer transaction via the promotion information, the sending party 104 may be more likely to use the cash-to-account money transfer transactions in the future because of the ease of receiving the funds by the receiving party. Thus, in the future, the money transfer entity is likely to receive higher fees for subsequent money transfer transactions initiated by the sending party 104 because the sending party 104 is more likely to utilize money transfer transaction services that offer the receiving party with access to the funds more rapidly, such as through the cash-to-account money transfer transaction and/or the expedited cash-to-account money transfer transaction.

In an aspect, the promotion information may include an advertisement. The advertisement may be for a product or service offered by an entity distinct from the money transfer entity operating the central server 110, the first point of entry device 130, or both. For example, the money transfer entity may operate a money transfer location within a shopping center or proximate to other retail establishments, and may sell advertising space on receipts to other businesses within the shopping center or the other retail establishments proximate to the money transfer location. In an aspect, the money transfer entity may charge a higher fee for larger advertisement or exclusive advertisements (e.g., when only one advertisement is included on the receipt).

In an aspect, the central server 110 and/or the first point of entry device 130 may determine the promotion information based on profile information, such as the profile information 124 and the profile information 142. The profile information may include historical transaction data that may be used to analyze trends in money transfer transactions, and to classify sending parties and receiving parties into groups. For example, the central server 110 may determine, based on an analysis of the profile information 124, that a certain group of sending parties frequently use a particular type of money transfer transaction (e.g., a cash-to-cash money transfer transaction) to transfer funds to receiving parties in a particular geographic area (e.g., a city, state, country, etc.). Due to frequency at which the group of sending parties utilize the particular type of money transfer transaction, the central server 110 may identify a different type of money transfer transaction (e.g., a cash-to-account money transfer transaction) that may provide a benefit (e.g., reduced delay in receiving funds in connection with the money transfer transaction) to the group of sending parties and/or the sending parties that receive funds from the money transfer transactions initiated by the group of sending parties. In an aspect, the different type of money transfer transaction may be identified based, at least in part, on whether previous promotion information was successful in enticing members of the group of sending parties to utilize the different type of money transfer transaction. In an aspect, the advertisement included in the promotion information may be selected based on information (e.g., a profile) associated with a sending party 104, based on information associated with a receiving party, or both.

In an aspect, the promotion information may include at least a portion of the transaction information. For example, the promotion information may include information identifying the sending party 104, a receiving party, an amount of the money transfer transaction, a type of the money transfer transaction, a form of payment used to fund the money transfer transaction, a date of the money transfer transaction, a transaction identifier, or other information. The portion of the transaction information may be utilized to configure and initiate a subsequent money transfer transaction between the sending party 104 and the receiving party.

For example, the central server 110 may generate a quick response (QR) code, and the promotion information, including the portion of the transaction information, may be embedded within the QR code. The QR code may be inserted into the receipt provided to the sending party 104, a receipt provided to the receiving party, or both. During a subsequent money transfer transaction initiated by the sending party 104, the portion of the transaction information may be used to configure the subsequent money transfer transaction. To illustrate, the sending party 104 may provide the receipt including the QR code to the operator of the first point of entry device 130 (or another point of entry device operated by or on behalf of the money transfer entity operating the first point of entry device 130), and the operator may scan the QR code (e.g., using one of the I/O devices 148). The first point of entry device 130 may extract the portion of the transaction information from the QR code and use the extracted portion of the transaction information to automatically configure the subsequent money transfer transaction. Thus, during the subsequent money transfer transaction, the sending party 104 may only need to specify the amount of funds to be transferred during the subsequent money transfer transaction and provide proof of identify (e.g., by showing a driver's license or other authorized form of identification) to the operator of the first point of entry device 130 to initiate a subsequent money transfer transaction to the sending party identified in the portion of the transaction information. This may reduce an amount of time required to initiate a money transfer transaction, improving customer satisfaction for customers of the money transfer entity operating the first point of entry device 130.

In an additional or alternative, if the promotion information embedded within the QR code on the receipt includes discount information, upgrade information, etc. The first point of entry device 130 may automatically prompt the sending party 104 to accept or decline the promotions. If the sending party 104 accepts the promotions, a fee for the subsequent money transfer transaction may be reduced, the money transfer transaction may be expedited, and/or the type of the money transfer may be upgraded. If the sending party 104 declines the promotions, the money transfer transaction is completed without discounts, expediting, or upgrading, and the promotions may be applied during a second subsequent money transfer transaction initiated by scanning the QR code subject to an expiration date, if any, for the discounts, expediting, or upgrading.

As can be appreciated, by embedding the portion of the transaction information into the QR code printed on the receipt, an ability to repeat the money transfer transaction may be increased (e.g., because a subsequent money transfer transaction may be configured according to the portion of the transaction information included in the promotion information), and privacy of the portion of the transaction information may be increased (e.g., because the portion of the information is embedded within the QR code and is not readable without using special equipment). Furthermore, by configuring subsequent money transfer transactions using the portion of the transaction information included in the promotion information embedded within the QR code, an amount of time required to complete the setup of the subsequent money transfer transaction may be reduced. Furthermore, the sending party 104 may realize the benefits provided by the QR code at any location provided by the money transfer entity that operates the first point of entry device 130. For example, the sending party 104 may initiate a first money transfer transaction at a location corresponding to the first point of entry device 130, and may initiate the subsequent money transfer transaction at a second location corresponding to the second point of entry device 150. The subsequent money transfer transaction may be configured by the second point of entry device 150 using information embedded within a QR code printed on a receipt generated by the central server 110 and printed by the first point of entry device 130.

The central server 110 may insert the promotion information into the receipt (e.g., prior to generating the PDF copy of the receipt and transmitting the receipt to the first point of entry device 130). In an aspect, the first point of entry device 130 may determine additional promotion information (e.g., promotion information that is in addition to any promotion information determined by the central server 110) that may be inserted into the region for inserting white label content or another region of the receipt reserved for inserting local advertising content. For example, the first point of entry device 130 may insert local content 144 that may be relevant to promotions in the area surrounding a location where the first point of entry device 130 is located. In an aspect, the local content 144 may be embedded within a second QR code. It is noted that the various types of promotions described herein are intended to be illustrative, rather than limiting, and that the promotion information inserted into receipts by the system 100 may include promotions other than those specifically provided herein.

In addition to generating a receipt for the sending party 104, the central server 110 may generate a second receipt for the money transfer transaction. The second receipt may be a receiving party receipt that includes information that enables a receiving party (e.g., a receiving party 106 or a receiving party 108) to receive funds in connection with the money transfer transaction initiated by the sending party 104. The second receipt may include second receipt information, second regulatory requirements information, and second service level information that may be different from the receipt information, the regulatory requirements information, and the service level information included in the receipt provided to the sending party 104. For example, as explained above, the transaction information received from the first point of entry device 130 may include information that identifies the receiving party. This information may indicate an address associated with the receiving party, bank account information associated with the receiving party, a location where the receiving party is to visit to receive the funds in connection with the money transfer transaction, or other information (e.g., the receiving party's address) that may be used to predict a location where the receiving party is likely to receive the funds in connection with the money transfer transaction. The predicted location may be used to determine regulatory requirements for the second receipt (and possibly a portion of the regulatory requirement information included in the sending party receipt), service level information to be included in the second receipt, and second promotion information that may be included in the second receipt. When the predicted location is different from the location of the first point of entry device 130 and the regulatory requirements indicate that the receipt provided to the sending party or the receiving party needs to include at least some of the receipt information provided to the other respective party, all or a portion of the respective receipt information, the regulatory requirements information, and the service level information may be the information included in the respective receipts provided to the sending party 104 and/or the receiving party.

In an aspect, the second service level information may include different service level information than the service level information included in the receipt provided to the sending party 104 irrespective of whether the locations of the receiving party and the first point of entry device 130 are the same. For example, the service level information included with the receipt provided to the sending party 104 may indicate when a withdrawal of funds from a bank account may occur (e.g., for account-to-cash, account-to-account, or debit card money transfer transactions), or when a charge may post to a credit card statement (e.g., for a credit card money transfer transaction), whereas the second service level information included with the receipt provided to the receiving party may indicate when a deposit of funds into a bank account associated with the receiving party may occur (e.g., for an account-to-account, cash-to-account, or other type of money transfer transaction resulting in a deposit of funds into an account of the receiving party), or when funds provided in a "to-cash" money transfer transaction (e.g., an account-to-cash money transfer transaction, etc.) will be available for pickup by the receiving party.

The central server 110 may generate the second receipt (e.g., the receiving party receipt), and/or a PDF copy of the second receipt, and may initiate transmission of the second receipt or the PDF copy of the second receipt to the receiving party. In an aspect, the receiving party may be a user 102 of the electronic device 180, and the second receipt may be transmitted to the receiving party by transmitting a message (e.g., a simple message service (SMS) message, a text message, a multimedia message, etc.) to the electronic device 180. In an additional or alternative aspect, the second receipt may be transmitted to an e-mail address associated with the receiving party. For example, the sending party 104 may provide the e-mail address associated with the receiving party to an employee operating the first point of entry device 130, and transaction information provided to the central server 110 by the first point of entry device 130 may include the e-mail address. The central server 110 may generate the second receipt (e.g., as a PDF) and transmit the e-mail message to the receiving party using the e-mail address provided by the sending party. Alternatively, the central server 110 may provide the second receipt to the first point of entry device 130 as a white label receipt, and the first point of entry device 130 may generate a second PDF copy of the receipt that includes the white label content. The first point of entry device 130 may transmit the second PDF copy of the receipt to the e-mail address and may provide the second PDF copy of the receipt to the central server 110 (e.g., for storage in the receipts 122).

The second receipt may include promotion information. The promotion information may include a QR code that may be scanned by an I/O device of a point of entry device to facilitate receipt of funds by the receiving party in connection with the money transfer transaction. For example, the receiving party may be the receiving party 106 and the QR code included in the second receipt may be read by a barcode scanner included in the I/O device 148 of the first point of entry device 130 to facilitate receipt of the funds. Alternatively or additionally, the receiving party may be the receiving party 108 and the QR code included in the second receipt may be read by a barcode scanner included I/O devices (not shown in FIG. 1) included in the second point of entry device 150.

The promotion information included in the second receipt may include promotions and advertisements that are different from promotions and advertisements included in the receipt provided to the sending party. For example, an advertisement included in the promotion information of the second receipt may be associated with products or services provided by a money transfer location that is distinct from the money transfer location where the first point of entry device 130 is located, or may be associated with products or services provided by a money transfer entity that is distinct from the money transfer entity that operates the first point of entry device 130.

Additionally or alternatively, the promotion information included in the second receipt may include advertisements for products and/or services provided by third party affiliates associated with the money transfer entity at the location where the receiving party is located. For example, the sending party may be located in a first location (e.g., a first city, state, country, etc.) and the receiving party may be located in a second location (e.g., a second city, state, country, etc.). The promotion information included in the receipt provided to the sending party may include advertisements for third party affiliates (e.g., entities other than the money transfer entity operating the first point of entry device 130 that have purchased advertisements or are engaged in cross-promotional advertising campaigns with the money transfer entity operating the first point of entry device 130) located at the first location, and the promotion information included in the second receipt provided to the receiving party may include advertisements for other third party affiliates (e.g., entities other than the money transfer entity operating the second point of entry device 150 that have purchased advertisements or are engaged in cross-promotional advertising campaigns with the money transfer entity operating the second point of entry device 150) located at the second location. The third party affiliates associated with the advertisements included in the receipt provided to the sending party may be the same as, or different from, the other third party affiliates associated with the advertisements included in the second receipt provided to the receiving party. In an aspect, the advertisements included in the promotion information included in the second receipt may be determined based on a profile associated with the receiving party, or a group profile (e.g., a profile associated with a group persons that utilize the services provided by the money transfer entity).

In an aspect, the money transfer entity operating the first point of entry device 130 may be required to periodically prove up compliance with the regulatory requirements for receipts provided in connection with providing money transfer services. In an aspect, the money transfer entity may prove up compliance with the regulatory requirements using an auditing feature of the first point of entry device 130. For example, the first point of entry device 130 may receive an audit request. The audit request may correspond to an input provided to the first point of entry device 130 by the operator of the first point of entry device 130. Alternatively or additionally, the input may correspond to an audit request message received at the first point of entry device 130 from the government agency device 170. In an aspect, the audit request message may be received at the central server 110, or via an input provided to the central server 110.

In response to the input (e.g., the audit request), the first point of entry device 130 (or the central server 110) may generate a report that includes information for establishing compliance with the regulatory requirements associated with completed money transfer transactions. The information included in the report may include information descriptive of different types of money transfer transactions, information descriptive of an amount of each completed money transfer transaction, information descriptive of locations where each of the money transfer transactions originated (e.g., locations where sending parties initiated money transfer transactions) and locations where each of the money transfer transactions was completed (e.g., locations where receiving parties received funds in connection with the money transfer transactions). The information included in the report may also include, for each type of money transfer transaction, information descriptive of the types of information included in the receipts. In an aspect, the audit request may identify a particular type of money transfer transaction for which the money transfer entity is to prove up compliance with the regulatory requirements.

To illustrate, the audit request may identify one or more money transfer transaction types. The first point of entry device 130 (or the central server 110) may identify completed money transfer transactions corresponding to the one or more money transfer transaction types. For example, when the audit request is being processed by the central server 110, the central server 110 may identify the completed money transfer transactions corresponding to the one or more money transfer transaction types by searching the receipts 122. When the audit request is being processed by the first point of entry device 130, the first point of entry device 130 may transmit a query to the central server 110 requesting identification of the completed money transfer transactions corresponding to the one or more money transfer transaction types (e.g., by searching the receipts 122). Although not illustrated in FIG. 1, in an aspect, the first point of entry device 130 may also store copies of receipts (e.g., sending party and receiving party receipts) at the database 138, and may identify the completed money transfer transactions corresponding to the one or more money transfer transaction types by searching the receipts stored at the database 138.

The first point of entry device 130 (or the central server) may retrieve the receipts associated with the completed money transfer transactions identified as corresponding to the one or more money transfer transaction types (or information included in the receipts), and may generate the report based on the retrieved receipts (or the information included in the receipts). For example, the report may include, for each of the one or more money transfer transaction types, copies of regulatory requirements information (e.g., text included any legal disclaimers and notices, warranties, return policies, etc.) provided on receipts in connection with the completed money transfer transactions corresponding to the one or more money transfer transaction types. Additionally, for each of the one or more money transfer transaction types, the report may include location information indicating locations where a number of money transfer transactions occurred. This may help prove up compliance with regulatory requirements when the operator of the first point of entry device 130, the second point of entry device 150, and/or the central server 110 facilitate money transfer transactions in numerous geographic locations, each geographic location potentially having different regulatory requirements. In an aspect, the report may include a listing of the relevant regulatory requirements for each location, and the regulatory requirements information may be provided proximate to the relevant regulatory requirements for each geographic location.

By enabling the first point of entry device 130, the second point of entry device 150, and/or the central server 110 to generate reports, proving up compliance with regulatory requirements may be simplified. Additionally, the reports generated in response to audit requests may reduce a likelihood that the operator of the first point of entry device 130, the second point of entry device 150, and/or the central server 110 are fined for non-compliance with applicable regulatory requirements. Further, the reports may reduce a likelihood that an operator loses a license (e.g., a license to provide money transfer services, a franchise license, etc.) as a result of non-compliance with appropriate regulatory requirements.

It is noted that, in some aspects, the sending party may be the user 102 and the money transfer transaction may be initiated using an application executing on the electronic device 180. Further, in some aspects, both the sending party and the receiving party may utilize electronic devices, such as the electronic device 180, to initiate and complete a money transfer transaction. In such aspects, the central server 110 may generate receipts (e.g., a sending party receipt and a receiving party receipt) for the money transfer transaction, and may provide the receipts to the respective electronic devices of the sending and receiving parties.

Figure 2:
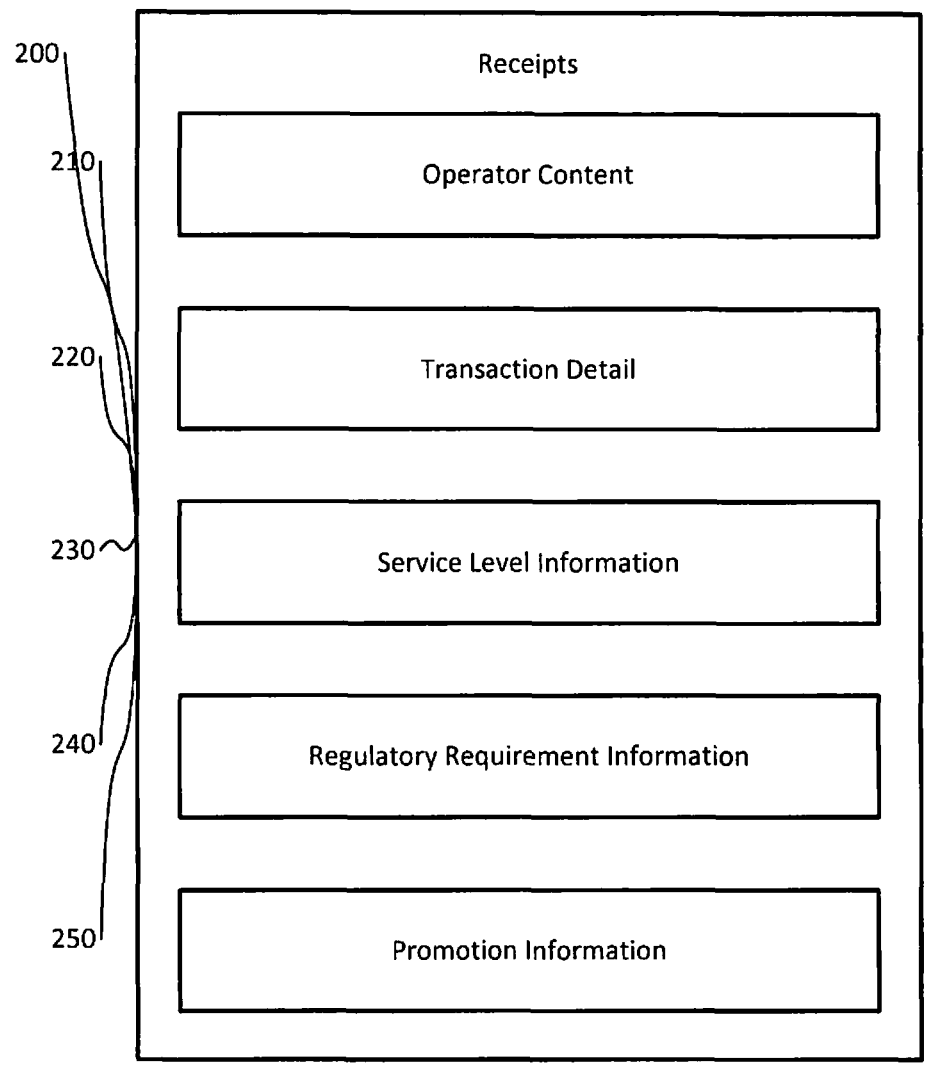
FIG. 2 illustrates aspects of a receipt generated in compliance with regulatory requirements.

Referring to FIG. 2, illustrative aspects of a receipt generated in compliance with regulatory requirements is shown as a receipt 200. In an aspect, the receipt 200 may have been generated by a central server, such as the central server 110 of FIG. 1. As shown in FIG. 2, the receipt 200 includes an operator content portion 210, a transaction detail portion 220, a service level information portion 230, a regulatory requirements information portion 240, and a promotion information portion 250. In an aspect, a central server (e.g., the central server 110 of FIG. 1) may leave the operator content portion 210 blank, and a point of entry device (e.g., the first point of entry device 130 or the second point of entry device 150 of FIG. 1) may insert white label content into the operator content portion 210. For example, because the operator content portion 210 was left blank, a receipt printer of the point of entry device may print the white label content in the operator content portion 210. The receipt, when provided to the sending party or the receiving party, may include the white label content. Thus, when the operator of the central server and the point of entry device are different, the receipt generated by the point of entry device may appear to have been created by the operator of the point of entry device.

The transaction detail portion 220 may include information descriptive of the money transfer transaction. For example, the transaction detail portion 220 may include information indicating an amount of funds being transferred from the sending party to the receiving party, a type of the money transfer transaction (e.g., an account-to-account money transfer transaction, a cash-to-account money transfer transaction, etc.), a time the money transfer transaction was initiated (e.g., when the receiving party provided the funds for the money transfer transaction). Additionally, the transaction detail portion 220 may include information indicating a date the money transfer transaction was initiated, a location where the money transfer transaction was initiated, an amount of fees charged for the money transaction, or other information.

The service level information portion 230 may include service level information for the money transfer transaction. As explained with reference to FIG. 1, the service level information may include different information depending on whether the receipt 200 is provided to the sending party or the receiving party. For example, when the receipt 200 is provided to the sending party, the server level information may indicate when funds will be withdrawn from an account of the sending party or when a charge to a financial card (e.g., a debit card or credit card) will post to a financial statement associated with the financial card. When the receipt 200 is provided to the receiving party, the service level information may indicate when funds will be available for pick up at a money transfer location, when a deposit in the amount of the money transfer transaction will be deposited into an account associated with the receiving party, a location where the funds may be picked up by the receiving party, etc. Additionally, the service level information portion 230 may include contact information descriptive of an entity (e.g., the money transfer entity, a financial institution, etc.) that the sending party and/or the receiving party should contact with questions regarding the money transfer transaction. It is noted that, in some aspects, the service level information included in the receipt provided to the sending party may be the same as the service level information included in the receipt provided to the receiving party.

The regulatory requirements information portion may include regulatory requirements information (e.g., legal notices and disclaimers, warranty information, refund policy information, explanations of fees charged, etc.) determined based on regulatory requirements associated with a location of the point of entry device where the money transfer transaction is initiated (e.g., when the receipt 200 is provided to the sending party), or based on regulatory requirements associated with a location where the receiving party resides or is to pick up the funds (e.g., when the receipt 200 is provided to the receiving party). The promotion information portion 250 may include advertisements, product and service offering upgrades, and other promotional information, as described with reference to FIG. 1. Additionally, the promotion information portion 250 may include a QR code (or other form of barcode) that may be used to configure a subsequent money transfer transaction, apply a discount to the subsequent money transfer transaction, etc., as described with reference to FIG. 1.

In an aspect, the QR code may include information descriptive of the sending party, the receiving party, the type of the money transfer transaction, account information (e.g., when the money transfer transaction is funded by withdrawing funds from an account of the sending party or when the funds are provided to the receiving party by depositing the funds into an account of the receiving party), a telephone number of the sending party, the receiving party, or both, and other information. By embedding this information in a QR code, the information may be kept more secure. For example, if the receipt is lost, a person finding the receipt cannot obtain the account information embedded in the QR code.

Figure 3:
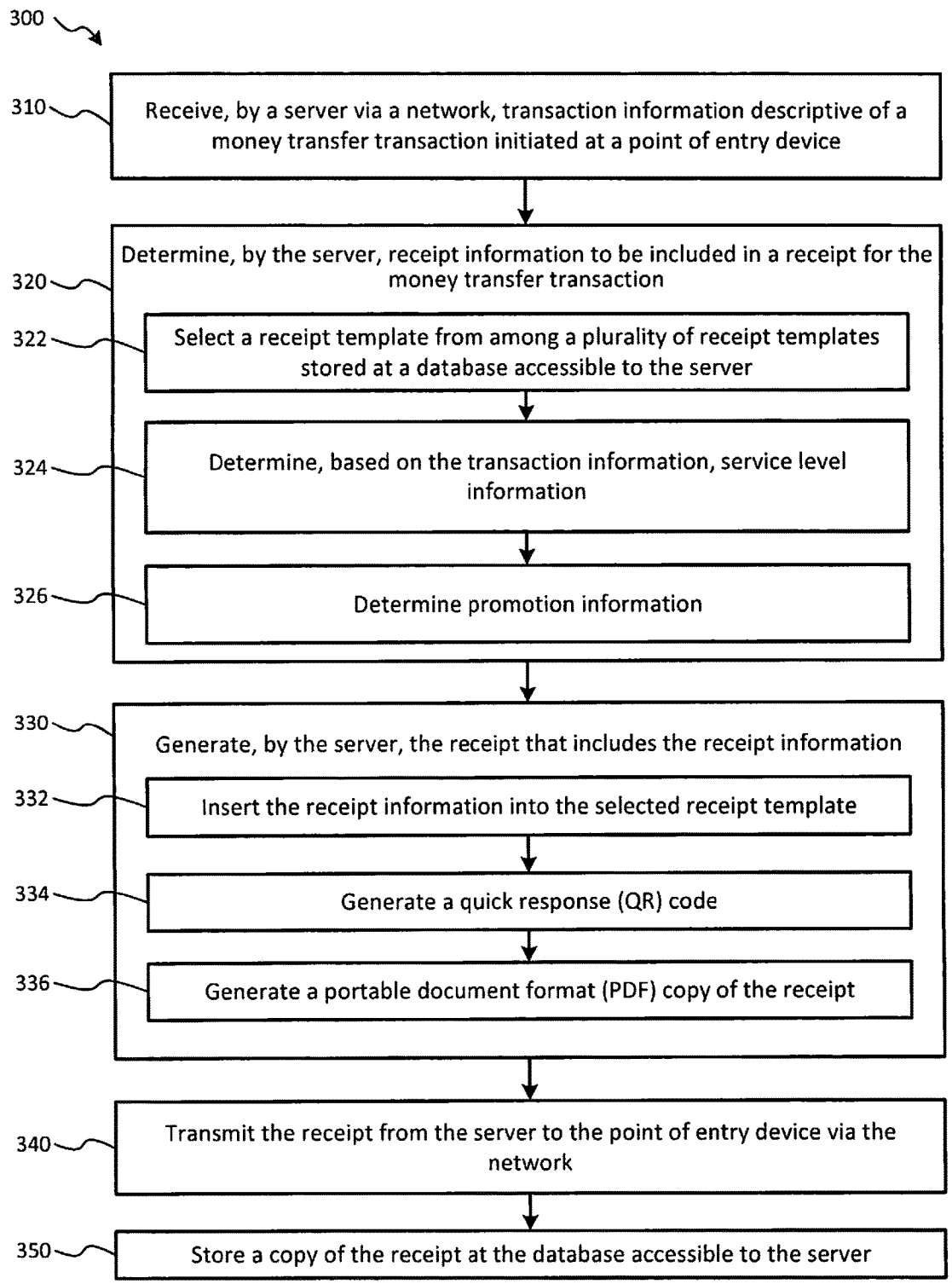
FIG. 3 illustrates a flow chart illustrating a method of generating a receipt for a money transfer transaction.

Referring to FIG. 3, a flow chart illustrating a method of generating a receipt for a money transfer transaction is shown as a method 300. In an aspect, the method 300 may be performed by the central server 110 of FIG. 1. For example, the instructions 116 may include instructions that, when executed by the processor 112, cause the processor 112 to perform operations corresponding to the steps of the method 300.

As shown in FIG. 3, the method 300 includes, at 310, receiving, by a server via a network, transaction information descriptive of a money transfer transaction initiated at a point of entry device. At 320, the method 300 includes determining, by the server, receipt information to be included in a receipt for the money transfer transaction. The receipt information may be determined based, at least in part, on the transaction information, and at least a portion of the receipt information included in the receipt may satisfy regulatory requirements associated with a location of a point of entry device (e.g., in the case of a sending party receipt) or regulatory requirements associated with a location associated with a receiving party (e.g., in the case of a receiving party receipt).

At 322, the method 300 includes selecting a receipt template from among a plurality of receipt templates stored at a database accessible to the server. In an aspect, the plurality of receipt templates may be the receipts 122 of FIG. 1, and the database may be the database 118 of FIG. 1. The receipt template may be selected based, at least in part, on the location of the point of entry device (for a sending party receipt) and/or a location of the receiving party (for a receiving party receipt). Each of the plurality of receipt templates may include one or more data fields (e.g., the operator content portion 210, the transaction detail portion 220, the service level information portion 230, the regulatory requirements information portion 240, and the promotion information portion 250 of FIG. 2) for inserting the receipt information, as described with reference to FIGS. 1 and 2.

At 324, the method 300 includes determining service level information based on the transaction information. As explained with reference to FIGS. 1 and 2, the service level information may include information that indicates when funds will be withdrawn from an account of the sending party, when funds will be deposited into an account of the receiving party, when the funds will be available for pickup by the receiving party, a location where the funds may be picked up by the receiving party, etc. Additionally, the service level information may include a transaction identifier and contact information for contacting the money transfer entity in connection with the money transfer transaction.

At 326, the method 300 includes determining promotion information. The promotion information may include discount information that provides a reduced fee during a subsequent money transfer transaction, provides an upgraded money transfer transaction type, etc., as described with reference to FIG. 1. In an aspect, the promotion information may include at least a portion of the transaction information, and, during a subsequent money transfer transaction, the promotion information may be used to configure the subsequent money transfer transaction, as described with reference to FIGS. 1 and 2. In an aspect, the promotion information may include an advertisement. The advertisement may be selected based on information associated with a sending party associated with the money transfer transaction, based on information associated with a receiving party associated with the money transfer transaction, or both, as described with reference to FIG. 1.

At 330, the method 300 includes generating, by the server, the receipt that includes the receipt information. At 332, the method 300 includes generating the receipt by inserting the receipt information into the selected receipt template. Inserting the receipt information into the selected receipt template may include inserting operator content into an operator content portion (e.g., the operator content portion 210 of FIG. 2) of the receipt or leaving the operator content portion blank (e.g., when the receipt is a white label receipt). Inserting the receipt information into the selected receipt template may include inserting transaction detail information into a transaction detail portion (e.g., the transaction detail portion 220 of FIG. 2) of the receipt, and inserting the service level information into a service level portion (e.g., the service level information portion 230 of FIG. 2) of the receipt. Additionally, inserting the receipt information into the selected receipt template may include inserting regulatory requirements into an regulatory requirement portion (e.g., the regulatory requirement information portion 240 of FIG. 2) of the receipt, and inserting regulatory requirements into a promotion information portion (e.g., the promotion information portion 250 of FIG. 2) of the receipt or leaving the operator content portion blank (e.g., when the receipt is a white label receipt). Inserting the receipt information into the selected receipt template may include inserting transaction detail information into a transaction detail portion (e.g., the transaction detail portion 220 of FIG. 2) of the receipt, and inserting the service level information into a service level portion (e.g., the service level information portion 230 of FIG. 2) of the receipt.

At 334, the method 300 includes generating a quick response (QR) code. At least a portion of the promotion information may be embedded within the QR code, and the QR code may be inserted into the receipt with the promotion information. The portion of the promotion information embedded within the QR code may be used to configure a subsequent money transfer transaction, apply discounts and upgrades, or facilitate other features, such as tracking the status of the money transfer transaction, as described with reference to FIGS. 1 and 2.

At 336, the method 300 includes generating a portable document format (PDF) copy of the receipt, and, at 340, transmitting the receipt from the server to the point of entry device via the network. It is noted that when the receipt is a receiving party receipt, the receipt may be transferred to an electronic device (e.g., the electronic device 180 of FIG. 1) associated with the receiving party, or to an e-mail address associated with the receiving party, as described with reference to FIG. 1. In an aspect, it is the PDF copy of the receipt that is transmitted from the server to the point of entry device (or the electronic device associated with the receiving party) via the network. At 350, the method 300 includes storing a copy of the receipt at the database accessible to the server.

By generating receipts using the method 300, a likelihood that the operator of the point of entry device and/or the server are fined for non-compliance with applicable regulatory requirements may be reduced or eliminated. Further, a likelihood that an operator or money transfer entity loses a license (e.g., a license to provide money transfer services, a franchise license, etc.) as a result of non-compliance with appropriate regulatory requirements may be reduced or eliminated.

Figure 4:
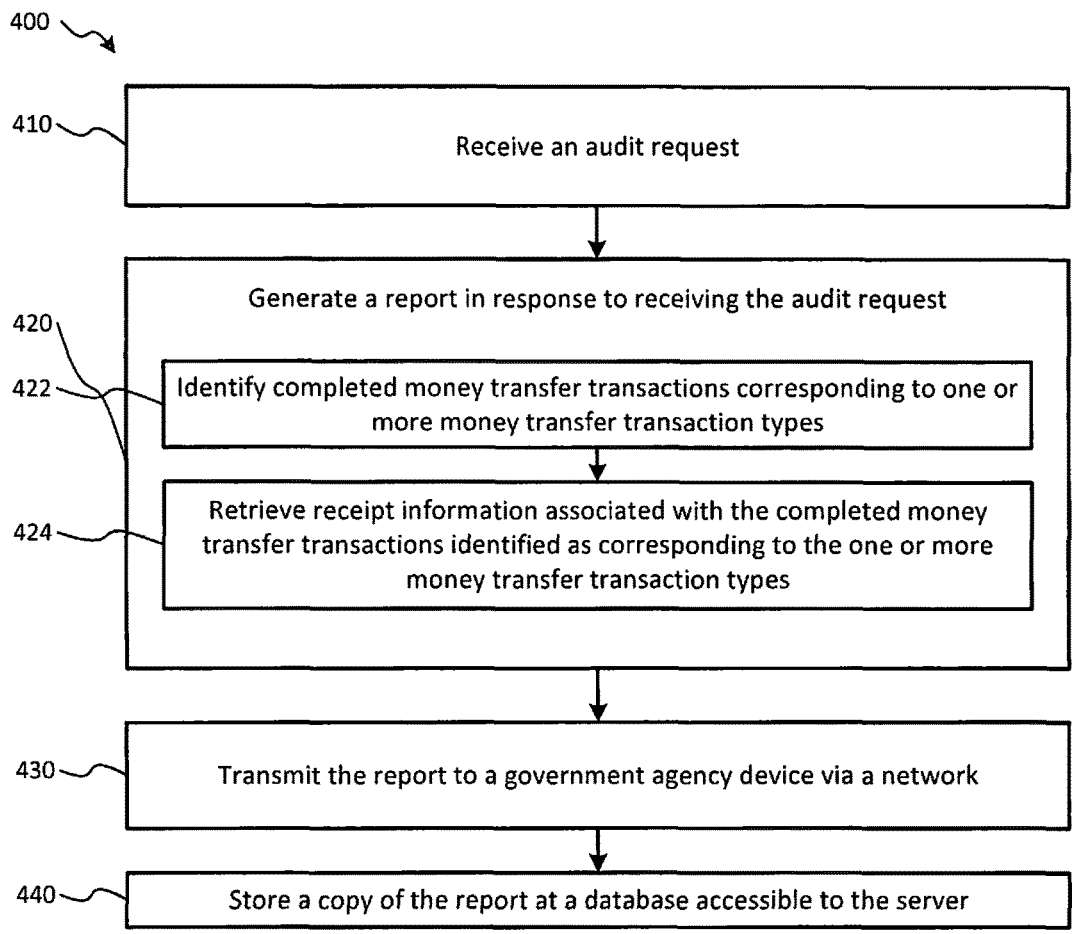
FIG. 4 illustrates a flow chart illustrating a method of generating a report for proving up compliance with regulatory requirements for receipts.

Referring to FIG. 4, a flow chart illustrating a method of generating a report proving up compliance with regulatory requirements for receipts is shown as a method 400. In an aspect, the method 400 may be performed by the central server 110 of FIG. 1, by first point of entry device 130 of FIG. 1, or by the second point of entry device 150 of FIG. 1. For example, the instructions 116, the instructions 136, or instructions stored at a memory (not shown in FIG. 1) of the second point of entry device 150 may include instructions that, when executed by the processor 112, the processor 132, or a processor (not shown in FIG. 1) of the second point of entry device 150, cause the respective processors to perform operations corresponding to the steps of the method 400.

At 410, the method 400 includes receiving an audit request. As explained above with respect to FIG. 1, the audit request may be received from a government agency device (e.g., the government agency device 170 of FIG. 1), or via an input provided to a central server (e.g., the central server 110 of FIG. 1) or a point of entry device (e.g., the first point of entry device 130 or the second point of entry device 150 of FIG. 1). The government agency may periodically transmit audit requests to a money transfer entity to ensure compliance with regulatory requirements imposed on a money transfer entity or its licensees and franchisees. Alternatively or additionally, the money transfer entity may periodically initiate the audit requests for self-reporting and internal regulatory compliance purposes.

At 420, the method 400 includes generating a report in response to receiving the audit request. The report may be generated based on information included in receipts (e.g., the receipts 122) stored at a database (e.g., the database 118 of FIG. 1). In an aspect, the audit request may request that the report be generated to show regulatory compliance for one or more money transfer transaction types (which may have the same or different regulatory requirements) and/or to show regulatory compliance at one or more locations. For example, the audit request may identify one or more money transfer transaction types and/or one or more locations for which the money transfer entity is to prove up regulatory compliance.

At 422, the method 400 includes identifying completed money transfer transactions corresponding to the one or more money transfer transaction types, and, at 424, retrieving receipt information associated with the completed money transfer transactions identified as corresponding to the one or more money transfer transaction types. The completed money transfer transactions may be identified based on information included in the receipts stored at the database. For example, the receipts 122 may be queried to identify receipts generated in response to money transfer transactions of a type corresponding to the one or more money transfer transaction types identified in the audit request. Each of the identified receipts may have been initiated (for sending party receipts) or completed (for receiving party receipts) in a location identified in the audit request. The retrieved receipt information associated with the identified receipts may include all information (e.g., regulatory requirements information that was included in the receipts, etc.) necessary to prove up compliance with regulatory requirements associated with the one or more money transfer transaction types identified in the audit request and the identified money transfer transactions may have been initiated or completed at the one or more locations identified in the audit request. Thus, by storing the receipts at the database, the central server (or the point of entry device) that received the audit request may be able to generate the report with the appropriate information for establishing compliance with the regulatory requirements imposed on money transfer transactions associated with the one or more money transfer transaction types and the one or more locations identified in the audit request.

At 430, the method 400 includes transmitting the report to a government agency device via a network. In an aspect, the government agency device may be the government agency device 170 of FIG. 1 and the network may be the network 160 of FIG. 1. It is noted that the report may be sent to device other than the government agency device, such as when the audit request is initiated by the central server as part of an internal auditing process. In such instances, the report may be transmitted to one or more locations associated with the audit. For example, the operator of the central server may initiate the audit request as part of the internal auditing process, and the audit request may identify one or more geographic locations where money transfer entities that utilize the central server for receipt creation are operating. The money transfer entities may be operated by a same entity as the operator of the central server or may include money transfer entities operating as franchisees or licensees of the operator of the central server. The report provided to each of the money transfer entities may be specific to each geographic location (e.g., a separate report is generated for each geographic location), and may include information indicating money transfer transaction types for which the respective money transfer entities are in compliance and money transfer transaction types for which the respective money transfer entities are not in compliance. The report may include information associated with steps that the respective money transfer entities should take to cure the non-compliance in the future.

Additionally, the report may indicate areas where the respective money transfer entities are in compliance, but, due to changes in the relevant regulatory requirements, will be non-compliant in the future. The report may further indicate that appropriate measures have been taken by the operator of the central server, such as creating new receipt templates in compliance with the changing regulatory requirements, and a date upon which the new receipt templates will be utilized for receipt generation. This may help educate the respective money transfer entities of the upcoming changes in the regulatory requirements, and may provide advanced notice that the receipts generated by the central server may change in the future, thereby reducing or eliminating confusion on the part of the operators of the point of entry devices and increasing a likelihood that receipts are generated in compliance with the relevant regulatory requirements.

At 440, the method 400 includes storing a copy of the report at the database accessible to the server. It is noted that the reports may be generated automatically, as opposed to in response to receiving an audit request. For example, the central server may be configured to periodically (e.g., once a month, once a quarter, etc.) generate the reports and provide the reports to the appropriate devices (e.g., the government agency device 170 and/or the point of entry devices). Furthermore, by implementing the audit requests as part of an internal auditing process, an amount of any fine imposed for non-compliance may be reduced because the internal auditing process may bring the cause of the non-compliance to the attention of the operator of the central server and/or the operators of the point of entry devices quickly, thereby reducing a number of instances where the non-compliance occurred. Thus, utilizing the method 400 may increase a likelihood that receipts are in compliance with regulatory requirements imposed on money transfer transactions.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method comprising:
storing a plurality of receipt templates at a database accessible to a server, wherein each receipt template of the plurality of receipt templates includes a status information that indicates whether the receipt template has been approved as compliant with one or more regulatory requirements, wherein each of the plurality of receipt templates includes one or more data fields for inserting regulatory requirement information, and wherein different locations are associated with different regulatory requirements;
receiving, by the server via a network, transaction information descriptive of a money transfer transaction initiated at a point of entry device, wherein the transaction information includes information that identifies a location of the point of entry device;
selecting a receipt template from among the plurality of receipt templates stored at the database accessible to the server, wherein the receipt template is selected based on a determination that: 1) the receipt template comprises regulatory requirements information that satisfies one or more regulatory requirements applicable to the location of the point of entry device; and 2) the status information of the receipt template indicates the regulatory requirements information included in the receipt template has been approved as compliant with the one or more regulatory requirements applicable to the location of the point of entry device;
determining, by the server, receipt information to be included in a receipt for the money transfer transaction, wherein the receipt information is determined based, at least in part, on the transaction information, and wherein at least a portion of the receipt information included in the receipt satisfies regulatory requirements associated with the location of the point of entry device;
generating, by the server, the receipt that includes the receipt information, wherein generating the receipt includes inserting regulatory requirement information associated with the location of the point of entry device into one or more data fields of the selected receipt template; and
transmitting the receipt from the server to the point of entry device via the network.

2. The method of claim 1, wherein the receipt information included in the receipt for the money transfer transaction comprises service level information, and wherein the method further comprises determining the service level information included in the receipt based, at least in part, on the transaction information, wherein the service level information includes an estimated date when funds transferred in connection with the money transfer transaction will be accessible to a receiving party to the money transfer transaction and contact information for a money transfer entity that operates the point of entry device.

3. The method of claim 1, wherein first status information for a first receipt template of the plurality of receipt templates comprises authorization information that indicates a time period during which the first receipt template is authorized for use in generating receipts comprising regulatory requirements.

4. The method of claim 3, wherein the first status information further comprises replacement information that identifies a second receipt template of the plurality of receipt templates that is to be replaced by the first receipt template during at least the time period indicated by the authorization information.

5. The method of claim 1, wherein the generating of the receipt includes generating a portable document format (PDF) copy of the receipt, and wherein the PDF copy of the receipt is transmitted from the server to the point of entry device via the network.

6. The method of claim 1, wherein the method includes storing a copy of the receipt at a database accessible to the server.

7. The method of claim 1, wherein the method includes:
generating a second receipt for the money transfer transaction, wherein the receipt is a sending party receipt, wherein the second receipt is a receiving party receipt, and wherein the second receipt includes information that enables the receiving party to receive funds in connection with the money transfer transaction; and
initiating transmission of the second receipt from the server to an electronic device associated with the receiving party.

8. The method of claim 1, wherein the receipt is a white label receipt that includes a region for inserting local content generated by the point of entry device.

9. The method of claim 8, wherein the method includes:
determining promotion information, wherein the promotion information includes discount information that provides at least one of a reduced fee, expedited handling, and upgraded money transfer transaction type during a subsequent money transfer transaction; and
inserting the promotion information into the receipt.

10. The method of claim 9, wherein the promotion information includes at least a portion of the transaction information, and wherein, during a subsequent money transfer transaction, the promotion information is used to configure the subsequent money transfer transaction.

11. The method of claim 9, wherein the method includes generating a quick response (QR) code, wherein the promotion information is embedded within the QR code, and wherein the inserting of the promotion information into the receipt includes inserting the QR code into the receipt.

12. A system comprising:
a database configured to store a plurality of receipt templates at a database accessible to a server, wherein each receipt template of the plurality of receipt templates includes a status information that indicates whether the receipt template has been approved as compliant with one or more regulatory requirements, wherein each of the plurality of receipt templates includes one or more data fields for inserting regulatory requirement information, and wherein different locations are associated with different regulatory requirements;
a central server comprising a processor, and a memory storing instructions that, when executed by the processor, cause the processor to perform operations comprising:
receiving, by the processor via a network, transaction information descriptive of a money transfer transaction initiated at a point of entry device, wherein the transaction information includes information that identifies a location of the point of entry device;
selecting a receipt template from among the plurality of receipt templates stored at the database, wherein the receipt template is selected based on a determination that: 1) the receipt template comprises regulatory requirements information that satisfies one or more regulatory requirements applicable to the location of the point of entry device; and 2) the status information of the receipt template indicates the regulatory requirements information included in the receipt template has been approved as compliant with the one or more regulatory requirements applicable to the location of the point of entry device;
determining, by the server, receipt information to be included in a receipt for the money transfer transaction, wherein the receipt information is determined based, at least in part, on the transaction information, and wherein at least a portion of the receipt information included in the receipt satisfies regulatory requirements associated with the location of the point of entry device;
generating, by the server, the receipt that includes the receipt information, wherein generating the receipt includes inserting regulatory requirement information associated with the location of the point of entry device into one or more data fields of the selected receipt template; and
transmitting the receipt from the server to the point of entry device via the network.

13. The system of claim 12, wherein the receipt information included in the receipt for the money transfer transaction comprises service level information, and wherein the operations further comprise determining the service level information included in the receipt based, at least in part, on the transaction information, wherein the service level information includes an estimated date when funds transferred in connection with the money transfer transaction will be withdrawn from an account of a sending party to the money transfer transaction and contact information for a money transfer entity that operates the point of entry device.

14. The system of claim 13, wherein the operations include:
generating a second receipt for the money transfer transaction, wherein the receipt is a sending party receipt, wherein the second receipt is a receiving party receipt, and wherein the second receipt includes information that enables the receiving party to receive funds in connection with the money transfer transaction;
initiating transmission of the second receipt from a server to an electronic device associated with the receiving party; and
storing a copy of the receipt and a copy of the second receipt at a database accessible to the server.

15. The system of claim 14, wherein the operations include determining, based on the transaction information, second service level information that is different from the service level information, wherein the second service level information comprises an estimated date when funds transferred in connection with the money transfer transaction will be accessible to the receiving party and contact information for a money transfer entity that operates one or more second point of entry devices at a location where the receiving party is predicted to receive the funds.

16. The system of claim 12, wherein the receipt is a white label receipt that includes a region for inserting local content generated by the point of entry device, wherein the local content includes branding information associated with an operator of the point of entry device, and wherein the operator of the point of entry device is different from an operator of the central server.

17. The system of claim 12, wherein the generating of the receipt includes generating a portable document format (PDF) copy of the receipt, and wherein the PDF copy of the receipt is transmitted from a server to the point of entry device via the network.

18. The system of claim 12, wherein first status information for a first receipt template of the plurality of receipt templates comprises authorization information that indicates a time period during which the first receipt template is authorized for use in generating receipts comprising regulatory requirements and replacement information that identifies a second receipt template of the plurality of receipt templates that is to be replaced by the first receipt template during at least the time period indicated by the authorization information, the operations further comprising:
  replacing the second receipt template with the first receipt template in response to a determination that a current time period corresponds to the time period during which the first receipt template is authorized for use in generated receipts comprising regulatory requirements information.

19. The system of claim 12, wherein the operations include:
  determining promotion information based on the transaction information, wherein the promotion information includes discount information that provides at least one of a reduced fee during a subsequent money transfer transaction, a reduced delay in providing funds to a receiving party in connection with the subsequent money transfer transaction, and an upgraded transaction type for the subsequent money transfer transaction;
  generating a quick response (QR) code, wherein at least a portion of the promotion information is embedded within the QR code; and
  inserting the QR code into the receipt.

20. The system of claim 19, wherein at least a portion of the transaction information is embedded within the QR code, and wherein, during a subsequent money transfer transaction, the promotion information is extracted from the QR code and used to configure the subsequent money transfer transaction.

21. The system of claim 19, wherein the promotion information includes an advertisement, wherein the advertisement is selected based on information associated with a sending party associated with the money transfer transaction, based on information associated with a receiving party associated with the money transfer transaction, or both.

22. A non-transitory computer-readable storage medium storing instructions that, when executed by a processor, cause the processor to perform operations comprising:
  storing a plurality of receipt templates at a database accessible to a server, wherein each receipt template of the plurality of receipt templates includes a status information that indicates whether the receipt template has been approved as compliant with one or more regulatory requirements, wherein each of the plurality of receipt templates includes one or more data fields for inserting regulatory requirement information, and wherein different locations are associated with different regulatory requirements;
  receiving, by the processor via a network, transaction information descriptive of a money transfer transaction initiated at a point of entry device, wherein the transaction information includes information that identifies a location of the point of entry device;
  selecting a receipt template from among the plurality of receipt templates stored at the database, wherein the receipt template is selected based on a determination that: 1) the receipt template comprises regulatory requirements information that satisfies one or more regulatory requirements applicable to the location of the point of entry device; and 2) status information of the receipt template indicates the regulatory requirements information included in the receipt template has been approved as compliant with the one or more regulatory requirements applicable to the location of the point of entry device;
  determining, by the server, receipt information to be included in a receipt for the money transfer transaction, wherein the receipt information is determined based, at least in part, on the transaction information, and wherein at least a portion of the receipt information included in the receipt satisfies regulatory requirements associated with the location of the point of entry device;
  generating, by the server, the receipt that includes the receipt information, wherein generating the receipt includes inserting regulatory requirement information associated with the location of the point of entry device into one or more data fields of the selected receipt template; and
  transmitting the receipt from the server to the point of entry device via the network.

23. The computer-readable storage medium of claim 22, wherein the receipt information included in the receipt for the money transfer transaction comprises service level information, and wherein the operations further comprise determining the service level information included in the receipt based, at least in part, on the transaction information, wherein the service level information includes an estimated date when funds transferred in connection with the money transfer transaction will be withdrawn from an account of a sending party to the money transfer transaction and contact information for a money transfer entity that operates the point of entry device.

24. The computer-readable storage medium of claim 23, wherein the operations include:
  generating a second receipt for the money transfer transaction, wherein the receipt is a sending party receipt, wherein the second receipt is a receiving party receipt, and wherein the second receipt includes information that enables a receiving party to receive funds in connection with the money transfer transaction;
  initiating transmission of the second receipt from a server to an electronic device associated with the receiving party; and
  storing a copy of the receipt and a copy of the second receipt at a database accessible to the server.

25. The computer-readable storage medium of claim 24, wherein the operations include determining, based on the transaction information, second service level information that is different from the service level information, wherein the second service level information comprises an estimated date when funds transferred in connection with the money transfer transaction will be accessible to a receiving party to the money transfer transaction and contact information for a money transfer entity that operates one or more second point of entry devices at a location where the receiving party is predicted to receive the funds.

26. The computer-readable storage medium of claim 22, wherein the operations further comprise:
   determining promotion information based on the transaction information, wherein the promotion information includes discount information that provides at least one of a reduced fee during a subsequent money transfer transaction, a reduced delay in providing funds to a receiving party in connection with the subsequent money transfer transaction, and an upgraded transaction type for the subsequent money transfer transaction;
   generating a quick response (QR) code, wherein at least a portion of the promotion information is embedded within the QR code; and
   inserting the QR code into the receipt.

27. The computer-readable storage medium of claim 26, wherein the operations further comprise:
   identifying one or more attributes of a sending party to the money transfer transaction, a receiving party to the money transfer transaction, or both; and
   determining, based on the one or more attributes, a group profile associated with a group of parties that have participated in money transfer transactions, wherein the promotion information is determined, at least in part, based on the group profile.

* * * * *